C. E. MYERS.
INFLATABLE TIRE PROTECTOR.
APPLICATION FILED NOV. 6, 1913.

1,117,691.

Patented Nov. 17, 1914.

Witnesses
L. S. Woodhull
M. E. Broesamle

Inventor
Charles E. Myers
By B. P. Wheeler
Attorney

UNITED STATES PATENT OFFICE.

CHARLES E. MYERS, OF DETROIT, MICHIGAN.

INFLATABLE-TIRE PROTECTOR.

1,117,691.

Specification of Letters Patent. Patented Nov. 17, 1914.

Application filed November 6, 1913. Serial No. 799,437.

*To all whom it may concern:*

Be it known that I, CHARLES E. MYERS, a citizen of the United States, residing at Detroit, in the county of Wayne, State of Michigan, have invented certain new and useful Improvements in Inflatable-Tire Protectors; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to pneumatic or inflatable tires for vehicle wheels and particularly to means for protecting such tires against liability to punctures, and consists in the construction and arrangement of parts hereinafter more fully set forth and pointed out particularly in the claims.

Figure 1:
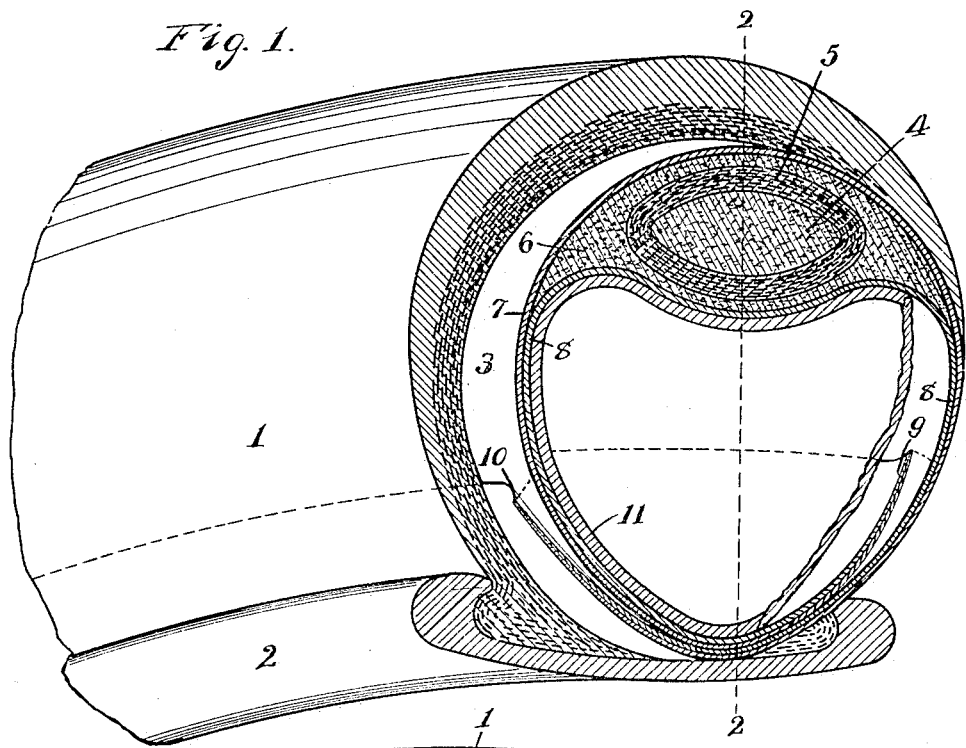
Figure 2:
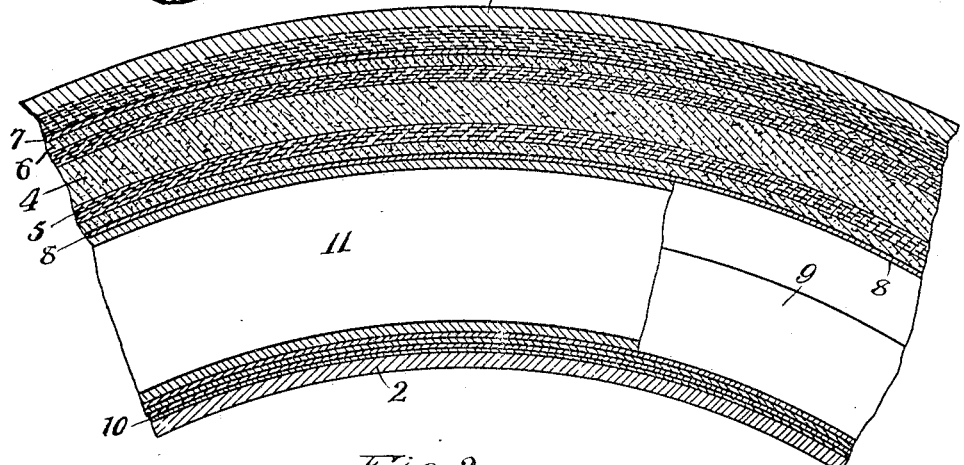

The object of the invention is to provide a simple and efficient reinforcement and puncture resisting protector for insertion in the casing, and for the reception of the inflatable air tube thereof, between which and said casing said protector is interposed. The formation of the protector being such as to dispose the air tube at a considerable distance from the inner wall of the tread of the casing so as to minimize the liability of puncturing said inner tube through the entering of sharp obstacles into the tread of the casing, wherein the composition and construction of the protector is such as to afford a reinforcement to the walls of the casing and to effect a yielding and pliable unison therewith in a manner not to impair the flexing qualities or resiliency of the tire. The above object is attained by the employment of the structure illustrated in the accompanying drawings, in which:

Figure 1 is a fragmentary sectional view through a tire casing and its attaching rim showing the protector, together with the air tube also in section, slightly withdrawn from the casing. Fig. 2 is a vertical sectional view through the casing, rim, protector and inner tube, taken on dotted line 2—2 of Fig. 1.

Referring to the drawings by the characters of reference marked thereon, 1 designates the tire or casing which is herein shown as attached to the rim 2 in a manner commonly employed for attaching tires of the "clencher" type. The casing, however, or the method of attachment to the rim constitutes no part of the present invention, as the protector herein shown is applicable to all standard makes of tire casings.

The protector, which will be referred to in general by the numeral 3, is a built-up structure comprising a body of sponge-like resilient material forming a core 4, and surrounding this resilient core, which is preferably elliptical in cross-section, and adapted to extend circumferentially of the protector with respect to the casing, is a friction fabric covering composed of a plurality of layers lying upon one another in the form of an endless fabric tube 5. Said core with its fabric tube is then embedded in a body of flexible resilient material 6 of a character similar to that of the core 4 of the structure, the nature of which being such as to permeate and adhere to the interstices of the fabric tube. The structure thus formed is interposed and confined between two or more layers of friction fabric 7 and 8, the layer of fabric 7 passing around and engaging the outermost contour of the body material 6 of the structure, while the fabric layer 8 lies in contact with the inner contour of the resilient body formation, the marginal portions of the two fabrics meeting and joining each other upon opposite sides of the protector and extending around in the direction of the circumference transversely of said protector, the free edge 9 of one side terminating upon the inner face of the layer 8, while the free edge 10 of the fabric 8 overlapping the edge 9 terminates upon the outer face of the layer 7 upon the opposite side of said protector, as shown in Fig. 1, in which view the terminal edges 9 and 10 are shown as slightly folded back from their respective meeting faces to avoid a confusion of lines, in order to better illustrate their overlapping relative to each other. The parts thus assembled, after being previously treated with a coating of suitable adhesive material upon their meeting faces, are subjected to pressure and heat treatment to cause the parts to adhere and unite in a homogeneous formation. The protector thus formed is adapted to receive an inflatable air tube 11 which is entered therein between the overlapping edges and is confined within the area formed between the body, side walls and overlapping edges of the protector, the whole being adapted for insertion within the casing 1 in such position as to dispose the thickened body portion of the protector in contact with the inner perimeter of the tread portion of said casing, thus placing the inner tube at a considerable distance from the tread or wearing surface of the tire, and obviating the liability of the inflatable tube becoming punctured except by an unusually long pointed object, in which case such object passing through the tread of the tire would encounter first the resistance of the friction fabric covering of the protector and would then meet with the further resistance of one or both walls of the fabric tube embedded in the resilient body formation of the protector. This body formation being of a yielding nature, and the fabric tube therein being unsupported except by the density of the resilient substance in which it is embedded, said tube would have a tendency to collapse or yield with the impact of a puncturing object, moving with said object and thus relieving the resistance that would otherwise tend to assist said object in effecting an entrance therethrough. It will be seen that by the employment of this tubular fabric formation embedded and suspended within the resilient body substance, said fabric tube not only serves as a double shield or guard against the entrance of puncturing objects into the air tube of the tire, but by reason of its tubular formation does not offer resistance to the free action of the substance in which it is embedded or to the resilient action of the casing of the tire greater than that offered by the resilient substance of the body of the protector. It will also be observed that the inner surface of the resilient body substance is arched outwardly along its central portion and inwardly at its end portions, and that the inner fabric layer is correspondingly arched in a sinuous or undulating manner so as to produce the required slack in the fabric to render the body of the protector extensible laterally of the tire, thus insuring at all times a close fitting contact with the distending sides of the tire casing, and thereby avoiding the liability of injury resulting to the inner tube by being forced between the body portion of the protector and the inner wall of the casing of the tire, as might be the case were the body of the protector incapable of lateral distension.

When the air tube of the tire is inflated, the pressure of said tube will force the side walls of the protector against the inner wall of the casing, and by reason of the extent of contact between said protector and inner wall, said protector will be maintained in place under pressure sufficient to insure it against the tendency of creeping within the casing, while the marginal portions or terminal edges of the protector overlapping each other will assist in holding said protector against expansion within the casing, thus relieving in a measure the pressure of the inner tube upon said casing, and also reinforcing said casing and protecting said inner tube against the liability of puncture through the entering of objects obliquely to the tread. The protector also serves to protect the inner tube against blowing out through the tread portion of the casing should said casing become torn or cut through the wall thereof. The protector being thus employed within the casing will not be subjected to any appreciable amount of wear and may be readily removed from a worn casing and replaced for use in a new one, thus enabling said protector to be repeatedly used with a number of casings.

Having thus fully set forth my invention, what I claim as new, and desire to secure by Letters Patent, is:—

1. In a tire, an outer casing having a tread portion, a protector contained within the casing, said protector comprising an outer layer of tough flexible material which contacts with the inner surface of the casing throughout the whole area thereof, an inner layer of tough flexible material contained within the outer layer in contact with opposite sides thereof and spaced apart therefrom on the side adjacent the tread portion of the casing, a resilient flexible filling for the said space between the layers, said filling being arched outwardly along its inner central portion and inwardly at its end portions whereby the inner layer is normally correspondingly arched on the side adjacent the tread portion of the casing, a flexible tubular guard embedded in the filling, said guard being substantially elliptical in cross section and having its major axis extending in said filling transversely of the tread portion of the tire, and an inflatable tube within the inner layer of the protector.

2. In a tire, an outer casing having a tread portion, a protector contained within the casing, said protector comprising an outer layer of tough flexible material which contacts with the inner surface of the casing throughout the whole area thereof and overlapped upon its marginal sides, an inner layer of tough flexible material contained within the outer layer in contact with the overlapping marginal sides and spaced apart therefrom on the side adjacent the tread portion of the casing, a resilient flexible filling for the said space between the layers, said filling being arched outwardly along its inner central portion whereby the inner layer is normally correspondingly reversely arched and rendered extensible transversely of the tread portion of the casing, a flexible tubular guard embedded in and filled with said filling, said guard being substantially elliptical in cross-section and having its major axis extending transversely across the tread portion of the tire, and an inflatable tube within the inner layer of the protector.

In testimony whereof, I sign this specification in the presence of two witnesses.

CHARLES E. MYERS.

Witnesses:
B. F. WHEELER,
M. E. BROESAMLE.